(12) United States Patent
Matsubayashi et al.

(10) Patent No.: US 12,321,441 B2
(45) Date of Patent: Jun. 3, 2025

(54) AUTHENTICATION APPARATUS, AUTHENTICATION METHOD AND PROGRAM FOR GENERATING A CHALLENGE IN ACCORDANCE WITH A STATE OF CHALLENGE-RESPONSE AUTHENTICATION WITH A CLIENT TERMINAL

(71) Applicant: NIPPON TELEGRAPH AND TELEPHONE CORPORATION, Tokyo (JP)

(72) Inventors: Masaru Matsubayashi, Tokyo (JP); Takuma Koyama, Tokyo (JP); Yasushi Okano, Tokyo (JP); Masashi Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 248 days.

(21) Appl. No.: 17/925,555

(22) PCT Filed: May 20, 2020

(86) PCT No.: PCT/JP2020/019954
§ 371 (c)(1),
(2) Date: Nov. 15, 2022

(87) PCT Pub. No.: WO2021/234861
PCT Pub. Date: Nov. 25, 2021

(65) Prior Publication Data
US 2023/0205863 A1    Jun. 29, 2023

(51) Int. Cl.
*G06F 21/44* (2013.01)

(52) U.S. Cl.
CPC ..................... *G06F 21/44* (2013.01)

(58) Field of Classification Search
CPC ........................................ G06F 21/44
See application file for complete search history.

(56) References Cited

U.S. PATENT DOCUMENTS

| 10,623,401 B1* | 4/2020 | Yager ................. H04L 67/12 |
| 2005/0177522 A1* | 8/2005 | Williams ............ G07F 7/1008 |
| | | 705/72 |

(Continued)

FOREIGN PATENT DOCUMENTS

| JP | 2002026898 A | * | 1/2002 |
| WO | 2019026833 A1 | | 2/2019 |

OTHER PUBLICATIONS

International Standard (2013) "Road vehicles—Unified diagnostic services (UDS)" ISO14229-1 Second edition, 2013/3/15 [online] website: https://www.iso.org/standard/55283.html.

*Primary Examiner* — Hee Soo Kim (57) ABSTRACT

An authentication apparatus that performs authentication of a client terminal by challenge-response authentication, the authentication apparatus includes one or more computers each including a memory and a processor configured to: receive a challenge request from the client terminal; generate a challenge as to the challenge request; and transmit the challenge to the client terminal. The memory and the processor are configured to generate the challenge by one generating method out of a fixed generating method in which a challenge of a fixed value is generated, and a random generating method in which a challenge of a random value is generated, in accordance with a state of the authentication apparatus.

6 Claims, 10 Drawing Sheets

(56) References Cited

U.S. PATENT DOCUMENTS

| | | | |
|---|---|---|---|
| 2005/0188200 A1* | 8/2005 | Kwok | H04L 9/3273 713/168 |
| 2007/0157300 A1* | 7/2007 | Sivaradjane | H04L 63/1458 726/9 |
| 2009/0300364 A1* | 12/2009 | Schneider | H04L 63/08 713/181 |
| 2011/0208964 A1* | 8/2011 | Sama | H04L 9/3271 713/168 |
| 2014/0150090 A1* | 5/2014 | Cicala | G06F 21/44 726/19 |
| 2020/0272717 A1* | 8/2020 | Figueredo de Santana | G06V 40/172 |

* cited by examiner

AUTHENTICATION APPARATUS, AUTHENTICATION METHOD AND PROGRAM FOR GENERATING A CHALLENGE IN ACCORDANCE WITH A STATE OF CHALLENGE-RESPONSE AUTHENTICATION WITH A CLIENT TERMINAL

CROSS-REFERENCE TO RELATED APPLICATIONS

This application is a U.S. National Stage Application filed under 35 U.S.C. § 371 claiming priority to International Patent Application No. PCT/JP2020/019954, filed on 20 May 2020, the disclosure of which is hereby incorporated herein by reference in its entirety.

TECHNICAL FIELD

The present invention relates to challenge-response authentication.

BACKGROUND ART

Challenge-response authentication is a type of an authentication method between a server and a client. In challenge-response authentication, the server transmits a challenge to a client terminal, the client terminal combines data such as a password on the basis of the challenge received from the server and performs computation, and returns a hash value to the server as a response. The server performs authentication of the client terminal by confirming the hash value received from the client terminal.

Challenge-response authentication is used in an automotive diagnostics communication protocol (UDS: Unified Diagnostic Services), for example, when an ECU (Electronic Control Unit) serving as a server authenticates a diagnostic tool (NON-PATENT LITERATURE 1).

In the technology disclosed in NON-PATENT LITERATURE 1, each manufacturer, for example, can select, as a method for an ECU to generate a challenge, any one of two challenge generating methods of (1) a fixed generating method in which a fixed challenge is generated each time a challenge request is received, and (2) a random generating method in which a challenge is randomly generated each time a challenge request is received.

CITATION LIST

Non-Patent Literature

[NON-PATENT LITERATURE 1] International Standard ISO14229-1 Second edition, 2013 Mar. 15, https://www.iso.org/standard/55283.html

SUMMARY OF THE INVENTION

Technical Problem

However, in a case of fixedly using one of the above-described two challenge generating methods of the fixed generating method and the random generating method, there is a problem of being vulnerable to attacks and there is a possibility that the authentication may be unauthorizedly penetrated. That is to say, there is a problem in the conventional technology that security may deteriorate in the challenge-response authentication.

The present invention has been made in view of the above, and it is an object to provide technology for improving security in challenge-response authentication.

Means for Solving the Problem

According to the technology of the disclosure, an authentication apparatus that performs authentication of a client terminal by challenge-response authentication, the authentication apparatus including:
a reception unit that receives a challenge request from the client terminal;
a control unit that generates a challenge as to the challenge request; and
a transmission unit that transmits the challenge to the client terminal,
the control unit generating the challenge by one generating method out of a fixed generating method in which a challenge of a fixed value is generated, and a random generating method in which a challenge of a random value is generated, in accordance with a state of the authentication apparatus, is provided.

Effects of the Invention

According to the disclosed technology, technology for improving security in challenge-response authentication is provided.

DESCRIPTION OF EMBODIMENTS

In the following, an embodiment according to the present invention (present embodiment) will be described with reference to the drawings. The embodiment described below is only an example, and embodiments to which the present invention is applied are not limited to the embodiment below.

System Configuration

Figure 1:
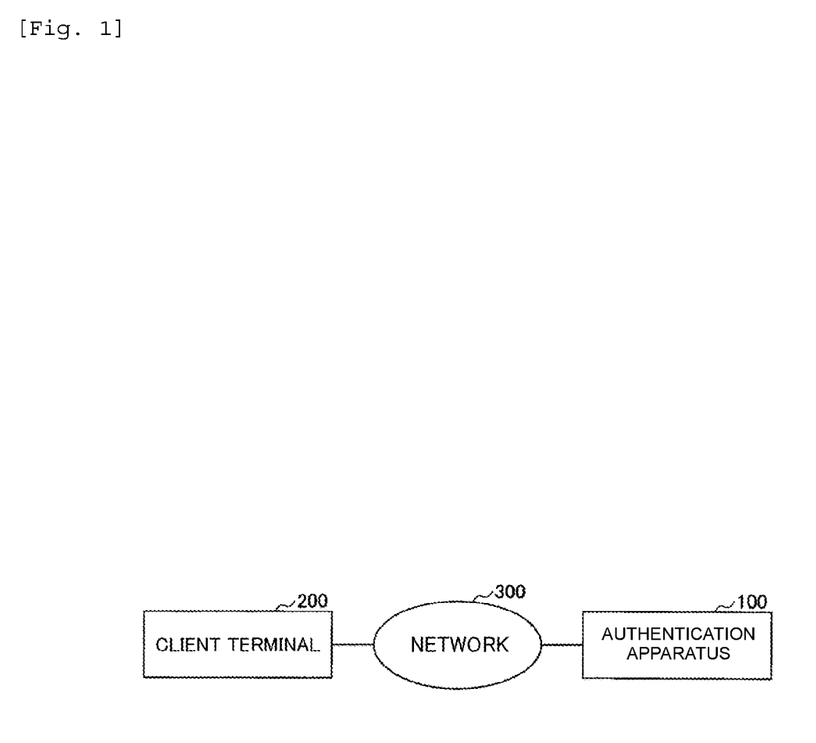
FIG. 1 is a configuration diagram of an authentication system according to an embodiment of the present invention.

FIG. 1 illustrates a configuration example of an authentication system according to the present embodiment. As illustrated in FIG. 1, the authentication system according to the present embodiment has a configuration including a client terminal 200 and an authentication apparatus 100, which are connected to a network 300.

The authentication apparatus 100 performs challenge-response authentication to authenticate the client terminal 200. A basic operation example of the authentication system will be described with reference to FIG. 2.

Figure 2:
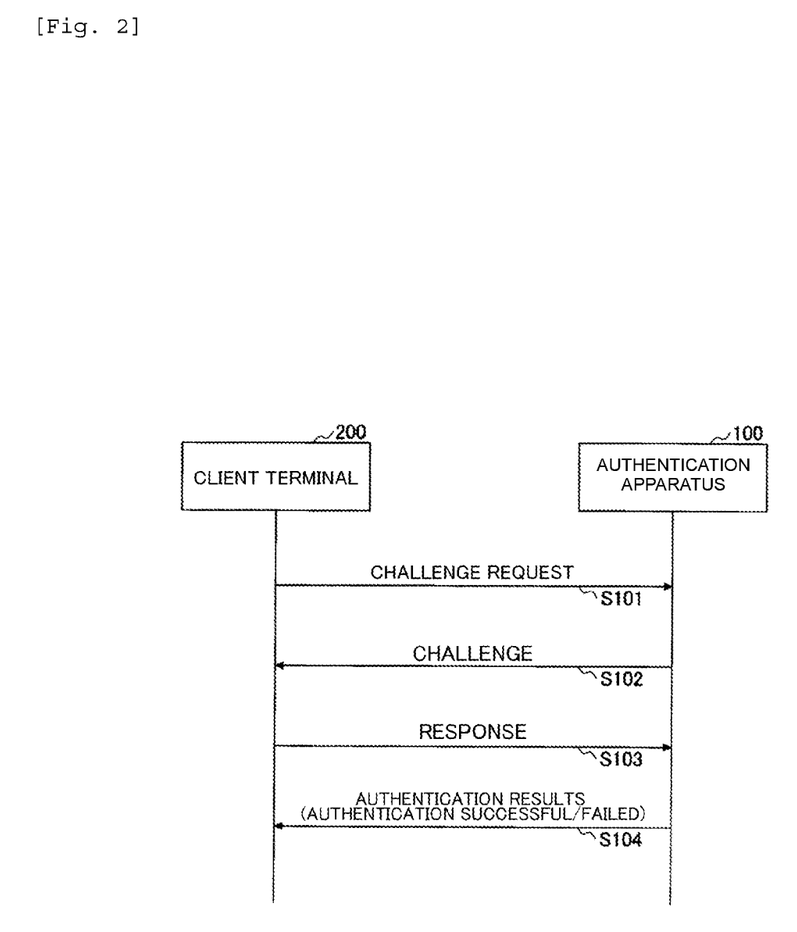
FIG. 2 is a sequence diagram for describing basic operations of the authentication system.

In S101, the client terminal 200 transmits a challenge request to the authentication apparatus 100. The challenge request is a message requesting the authentication apparatus 100 to transmit a challenge.

In S102, the authentication apparatus 100 transmits a challenge to the client terminal 200. The challenge transmitted from the authentication apparatus 100 to the client terminal 200 is a newly-generated random value (which may be referred to as a random number), or a fixed value. The fixed value is, for example, a value stored in the authentication apparatus 100 in advance. Also, the fixed value may be a value generated as a random value in the past being reused. Note that reading out a fixed value stored in the authentication apparatus 100 in advance and using for a challenge is included in "generating a challenge".

A challenge that is newly generated as a random value for each challenge transmission will be referred to as a random challenge, and a challenge with a fixed value will be referred to as a fixed challenge. The selection method selecting either the random challenge or the fixed challenge will be described later.

In S103, the client terminal 200 that has received the challenge performs computation to obtain a hash value using the challenge, generates a response that is a result of the computation, and transmits the response to the authentication apparatus 100.

In S104, the authentication apparatus 100 performs the same computation as the computation performed at the client terminal 200 using the challenge, compares the computation result with the response. If these values match, the authentication is determined to be successful, while if these values do not match, the authentication is determined to have failed, and the authentication results (authentication successful or authentication failed) are returned to the client terminal 200.

In a case where the authentication has failed, the client terminal 200 is expected to transmit a challenge request again. Authentication is performed again, on the basis of the repeated challenge request. However, upon detecting that failure in authentication of the client terminal 200 has occurred consecutively for a number of times that exceeds an allowed count N (where N is an integer of 0 or greater), the authentication apparatus 100 does not return challenges to challenge requests from the client terminal 200 for a predetermined amount of time that is set in advance.

In more detail, the computation of obtaining a hash value using the challenge in S103 and S104 may further use a password (or a user ID and a password), for example.

That is to say, in S103, the client terminal 200 obtains a hash value using a hash function, from a value in which the challenge and the password are coupled, and transmits this hash value to the authentication apparatus 100 as a response. In S104, the authentication apparatus 100 uses the password of the client terminal 200 stored in advance to perform the same computation as the computation at the client terminal, and perform authentication.

Problems

In the present embodiment, security is improved by the authentication apparatus 100 selecting one out of the fixed generating method in which a fixed challenge is generated and the random generating method in which a random challenge is generated, which will be described later. In a case of not having the configuration of selecting one out of the fixed generating method and the random generating method, i.e., in the case where one out of the fixed generating method and the random generating method is fixedly used, the authentication is vulnerable to attacks. In the following, examples of attacks in the case of fixedly using one out of the fixed generating method and the random generating method will be described, to facilitate understanding of the effects of the present embodiment.

Case of Fixedly Using Fixed Generating Method

An example of an attack by the client terminal 200 in a case where the authentication apparatus 100 is assumed to fixedly use the fixed generating method will be described with reference to FIG. 3.

In S11 to S14, challenge requests and authentication failures are repeated. The client terminal 200 carries out a Brute Force Attack or a side-channel attack by transmitting various responses as to the same fixed challenge to the authentication apparatus 100, and estimates the correct response. In the example in FIG. 3, the correct response is estimated as to the fixed challenge in S22, and authentication is successful. That is to say, authentication is unauthorizedly penetrated. The danger of this attack becomes great when the allowed count N is great.

Case of Fixedly Using Random Generating Method

Figure 4:
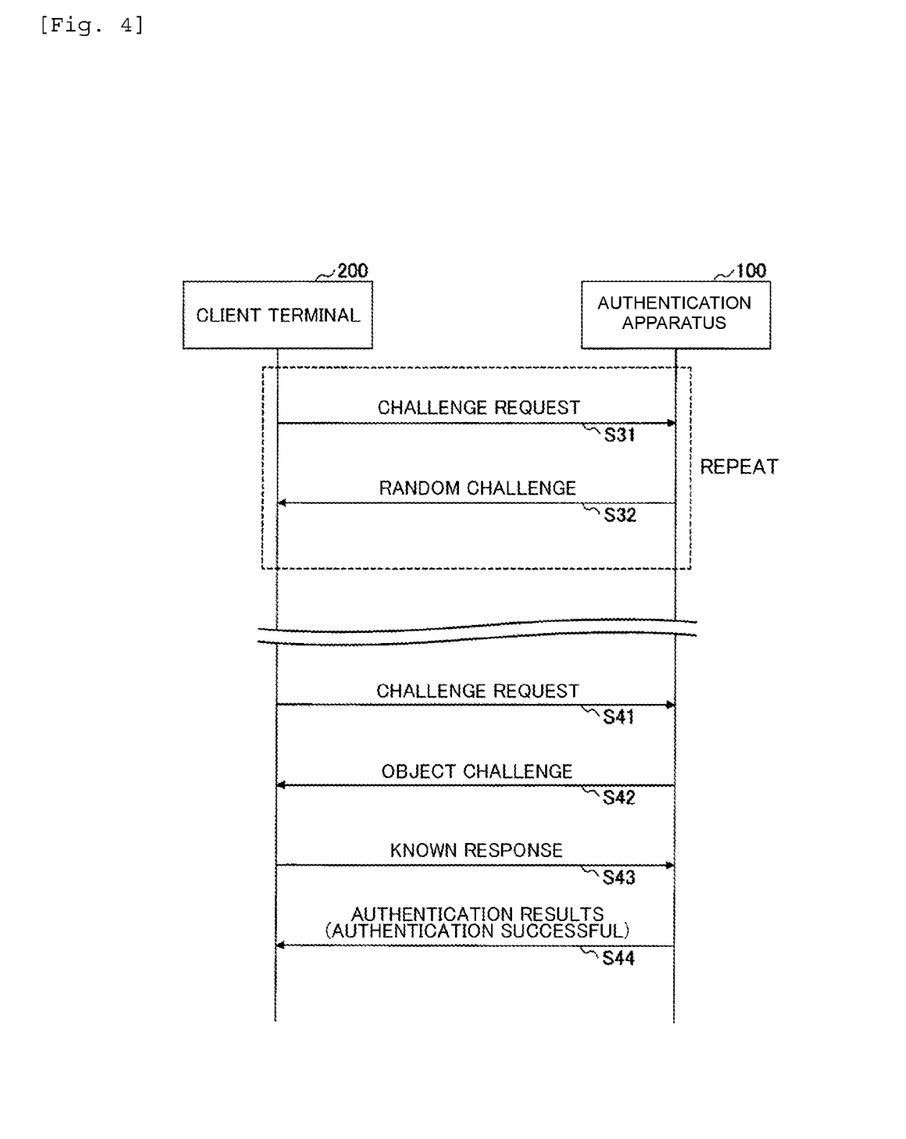
FIG. 4 is a diagram for describing an attack method in a case of randomly generating challenges.

A case of an example of an attack by the client terminal 200 in a case where the authentication apparatus 100 is assumed to fixedly use the random generating method will be described with reference to FIG. 4.

In the following, the client terminal 200, which is an attacker, will be assumed to know a response R to a certain challenge C.

The client terminal 200 repeats only challenge requests until a challenge C (the target challenge) is obtained (S31, S41), and in S42, at the point of obtaining the challenge C, responds with the response R (S43). Thus, the authentication is unauthorizedly penetrated.

With this attack, the client terminal 200 does not return a response until the challenge C is transmitted from the authentication apparatus 100, and accordingly the authentication has not failed even once. Accordingly, the attack works even when the allowed count N is small.

In the following, operations and so forth of the authentication system according to the present embodiment, in which the above-described vulnerability to attacks has been resolved, will be described.

Operation Example of Authentication System

In the present embodiment, the authentication apparatus 100 switches the challenge generating method (fixed generating method or random generating method) at an appropriate timing, in accordance with the state of the authentication apparatus 100.

More specifically, the authentication apparatus 100 generates the first challenge, and the first challenge following receiving a response by which the authentication failed, by the random generating method, and all other challenges are generated by the fixed generating method.

That is, in a case where the authentication apparatus 100 is in a state of having received a challenge request from the client terminal 200 for the first time, or in a case where the authentication apparatus 100 is in a state of having received a challenge request from the client terminal 200 for the first time following reception of a response by which the authentication failed, the authentication apparatus 100 generates a challenge by the random generating method.

Also, in a case where the authentication apparatus 100 is in a state of having received a challenge request from the client terminal 200 for the second time or having received a challenge request therefrom following the second time, before receiving a response, the authentication apparatus 100 generates a challenge by the fixed generating method.

Figure 5:
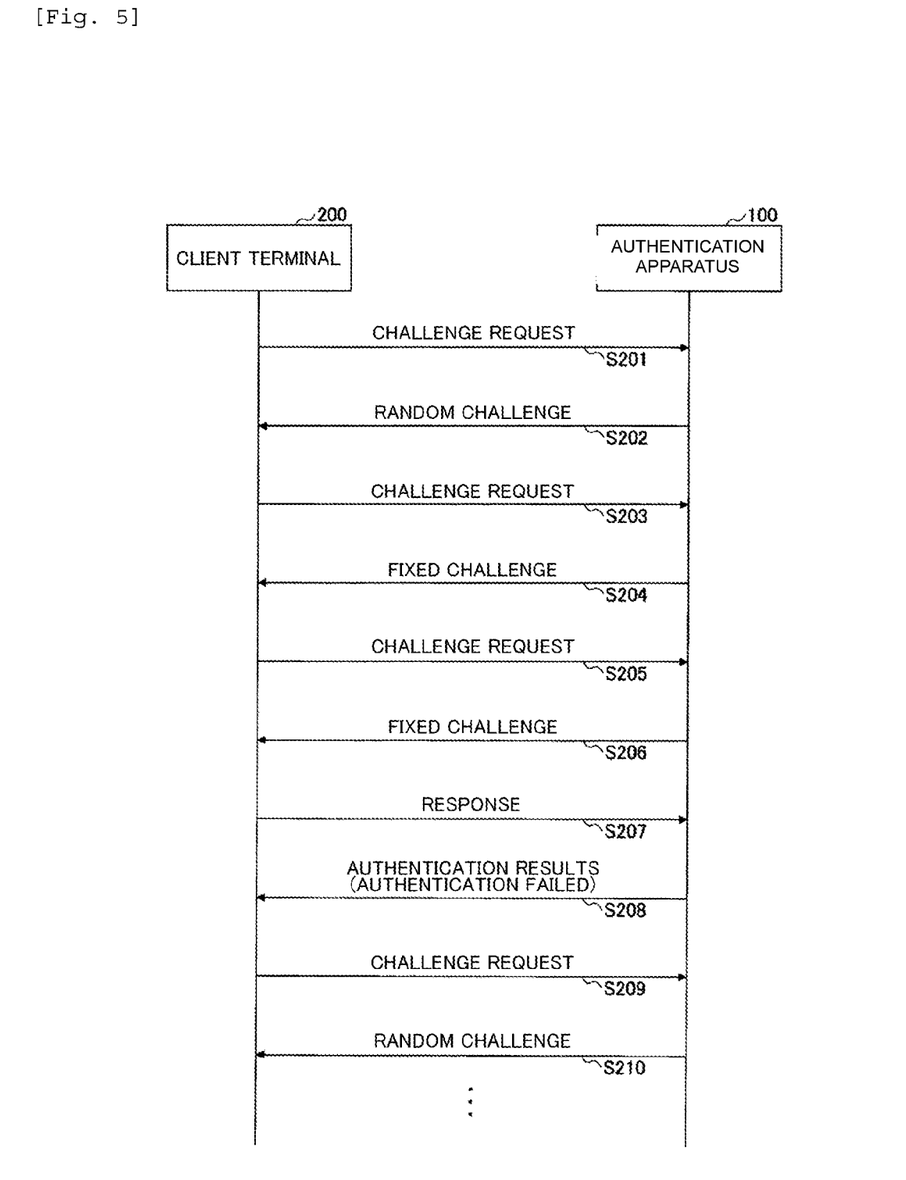
FIG. 5 is a sequence diagram for describing an operation example of the authentication system.

An operation example of the authentication system in a case of switching the challenge generating method by the above method will be described with reference to FIG. 5.

In S201, the client terminal 200 transmits a challenge request to the authentication apparatus 100. In S202, the authentication apparatus 100 generates a random challenge, and transmits the random challenge to the client terminal 200.

In the following, the client terminal 200 is assumed to attempt to carry out the attack described by way of FIG. 4. In S203, the client terminal 200 transmits a challenge request to the authentication apparatus 100. In S204, the authentication apparatus 100 generates a fixed challenge, and transmits the fixed challenge to the client terminal 200.

In S205, the client terminal 200 transmits a challenge request to the authentication apparatus 100. In S206, the authentication apparatus 100 generates a fixed challenge, and transmits the fixed challenge to the client terminal 200.

Figure 3:
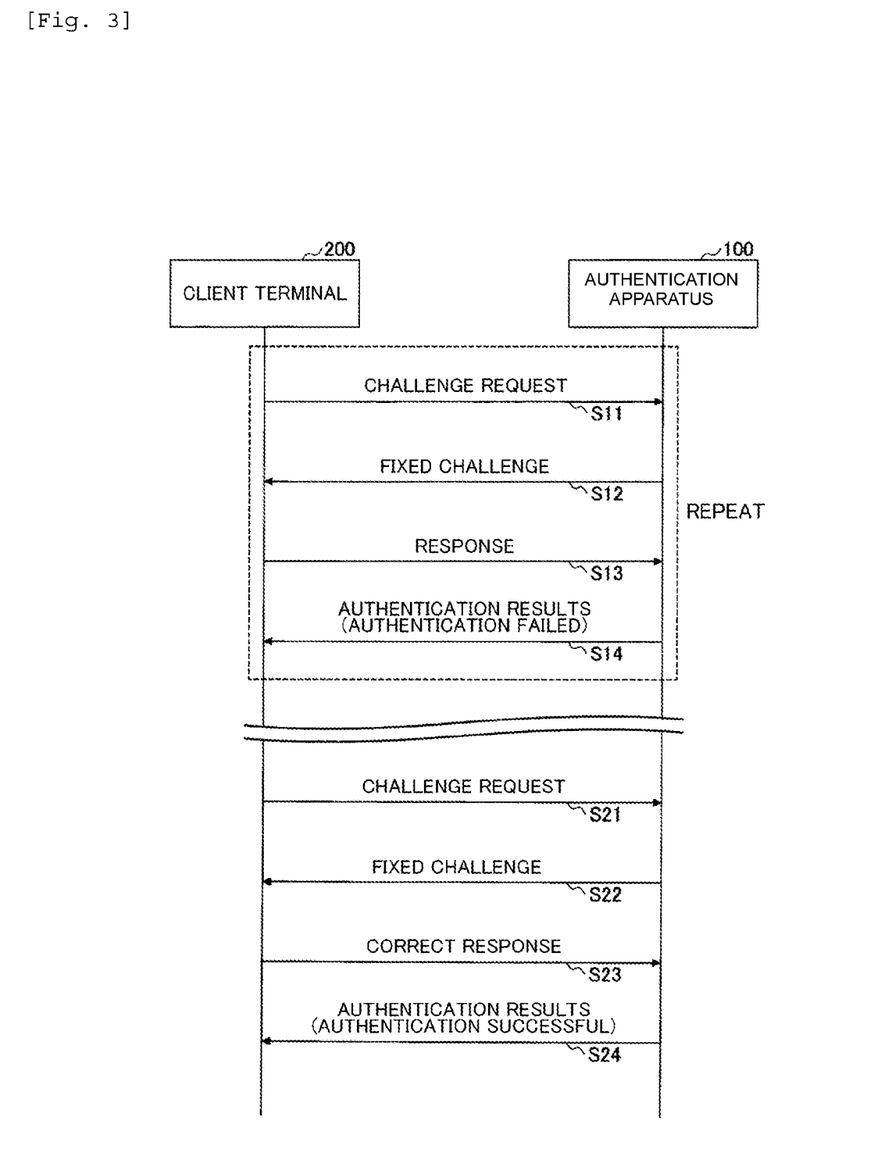
FIG. 3 is a diagram for describing an attack method in a case of fixedly generating challenges.

At this point in time, it is assumed that the client terminal 200 recognizes receiving a fixed challenge, and accordingly attempts to carry out the attack described by way of FIG. 3.

In S207, the client terminal 200 transmits a response to the authentication apparatus 100. In S208, the authentication apparatus 100 transmits authentication results (authentication failed) to the client terminal 200.

In S209, the client terminal 200 transmits a challenge request to the authentication apparatus 100. In S210, the authentication apparatus 100 generates a random challenge, and transmits the random challenge to the client terminal 200. Accordingly, the attack described by way of FIG. 3 becomes impossible even if attempted.

In a case of a client terminal 200 that is not an attacker, a correct response is returned after S202 for example, and the authentication is successful.

Effects

In a case of fixedly using the fixed generating method, there has been a problem in that various responses can be returned to the same fixed challenge, as described with reference to FIG. 3. In the technology according to the present invention, the authentication apparatus 100 randomly generates challenges after receiving a response (authentication failed), and thus the above problem can be solved. Accordingly, challenge-response authentication that is resilient against attacks that estimate a response or the like by Brute Force Attacks or side-channel attacks can be provided.

In a case of fixedly using the random generating method, there has been a problem in that challenge requests can be repeated until the target challenge is obtained, as described with reference to FIG. 4. In the technology according to the present invention, in a case where the client terminal 200 does not transmit a response and repeats only challenge requests, the authentication apparatus 100 transmits the same fixed challenge, and thus the above problem can be solved. Accordingly, challenge-response authentication that is resilient against attacks through knowledge of the response to a particular challenge can be provided.

Example of State Transition

Figure 6:
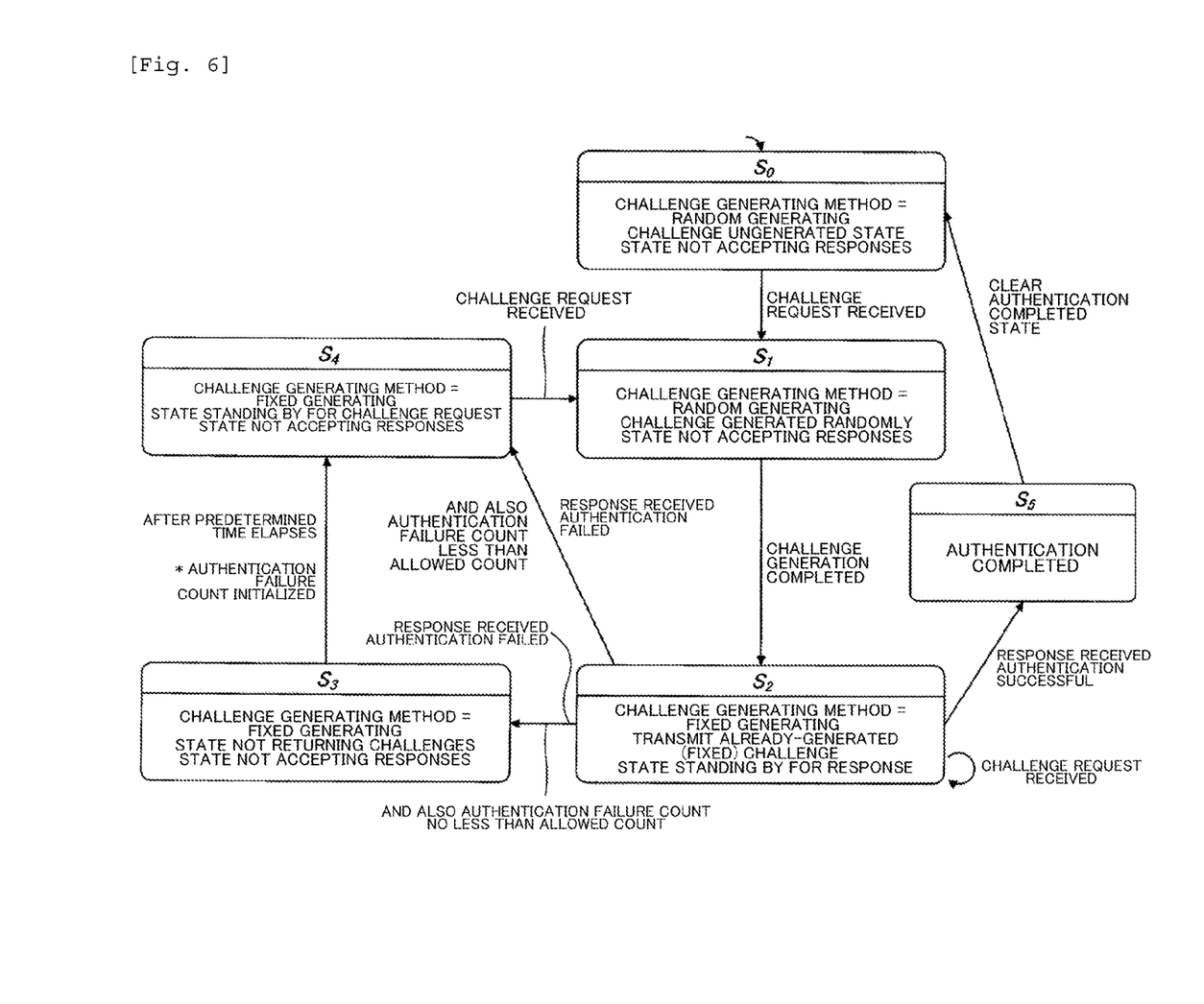
FIG. 6 is a diagram for describing state transition.

Next, an example of a state transition operation of the authentication apparatus 100 will be described with reference to FIG. 6, as a detailed operation example of the authentication apparatus 100. In FIG. 6, $S_n$ (n=0 to 5) represents a state.

$S_0$ is a challenge-ungenerated state, and is a state in which no response is accepted. In this state, the challenge generating method is random generating.

In the state of $S_0$, upon the authentication apparatus 100 receiving a challenge request, the state transitions to $S_1$. $S_1$ is a state in which no response is accepted, and the authentication apparatus 100 randomly generates a challenge. Upon generation of the challenge by the authentication apparatus 100 being completed in the state of $S_1$, the state transitions to $S_2$.

In the state of $S_2$, the authentication apparatus 100 transmits the generated challenge, and transitions to a response standby state. The challenge generating method is fixed generating, and in the state of $S_2$, each time a challenge request is received, the authentication apparatus 100 transmits a fixed challenge.

Upon the authentication apparatus 100 receiving a response in the state of $S_2$ and authentication being successful, the state transitions to an authentication completed state of $S_5$. Thereafter, the authentication apparatus 100 releases the authentication completed state, and transitions to the state of $S_0$.

Upon the authentication apparatus 100 receiving a response and authentication fails in the state of $S_2$, the state transitions to the state of $S_4$ if the number of times of the authentication failure is less than the allowed count. The state of $S_4$ is a challenge request standby state, and is a state in which no responses are accepted. The challenge generating method is fixed generating. Upon the authentication apparatus 100 receiving a challenge request in the state of $S_4$, the state transitions to $S_1$.

Upon the authentication apparatus 100 receiving a response and authentication failing in the state of $S_2$, the state transitions to the state $S_3$ if the number of times of the authentication failure is no less than the allowed count. The state of $S_3$ is a state in which no challenge is returned, and is a state in which no responses are accepted. The challenge generating method is fixed generating.

Upon a predetermined amount of time (a duration of time set in advance) elapsing in the state of $S_3$, the authentication failure count is initialized, and the state transitions to the state of $S_4$.

Example of Apparatus Configuration

Figure 7:
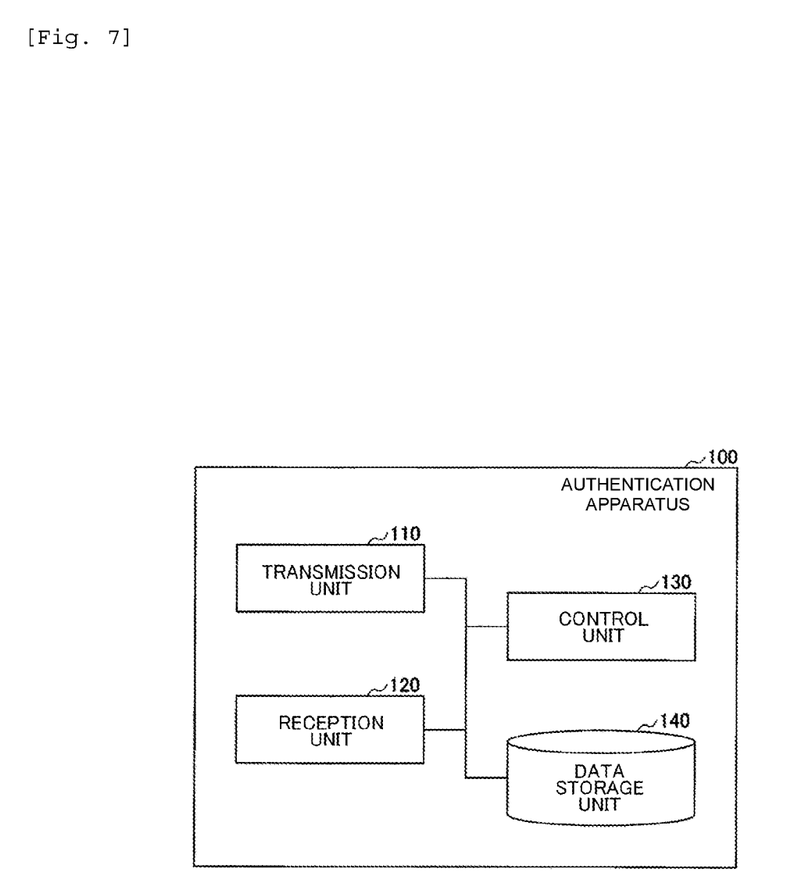
FIG. 7 is a diagram illustrating a configuration example of an authentication apparatus.

FIG. 7 illustrates a configuration example of the authentication apparatus 100 according to the present embodiment. The authentication apparatus 100 according to the present embodiment is provided with a transmission unit 110, a reception unit 120, a control unit 130, and a data storage unit 140, as illustrated in FIG. 7.

The transmission unit 110 transmits challenges to the client terminal 200. The transmission unit 110 also transmits authentication results to the client terminal 200. The reception unit 120 receives challenge requests from the client terminal 200. The reception unit 120 also receives responses from the client terminal 200.

The data storage unit 140 stores data to be used for processing, such as the fixed challenge, the allowed count, the duration of time set in advance, and so forth. The control unit 130 executes generating random challenges, computation for authentication, processing of authentication, and so forth. The control unit 130 also executes the state transition control described with reference to FIG. 6, by reading out and using the data stored in the data storage unit 140.

Note that the client terminal 200 may be any apparatus, as long as it is a apparatus that has functions of a known challenge-response authentication client.

Hardware Configuration Example

The authentication apparatus 100 according to the present embodiment can be realized by causing a computer, for example, to execute a program in which the processing content described in the present embodiment is described. Note that this "computer" may be a physical machine, or may be a virtual machine in the cloud. In a case of using a virtual machine, the "hardware" described here is virtual hardware.

The program can be recorded in a computer-readable recording medium (portable memory, etc.) and thus saved, distributed, and so forth. The program can also be provided through a network, such as the Internet, or email.

Figure 8:
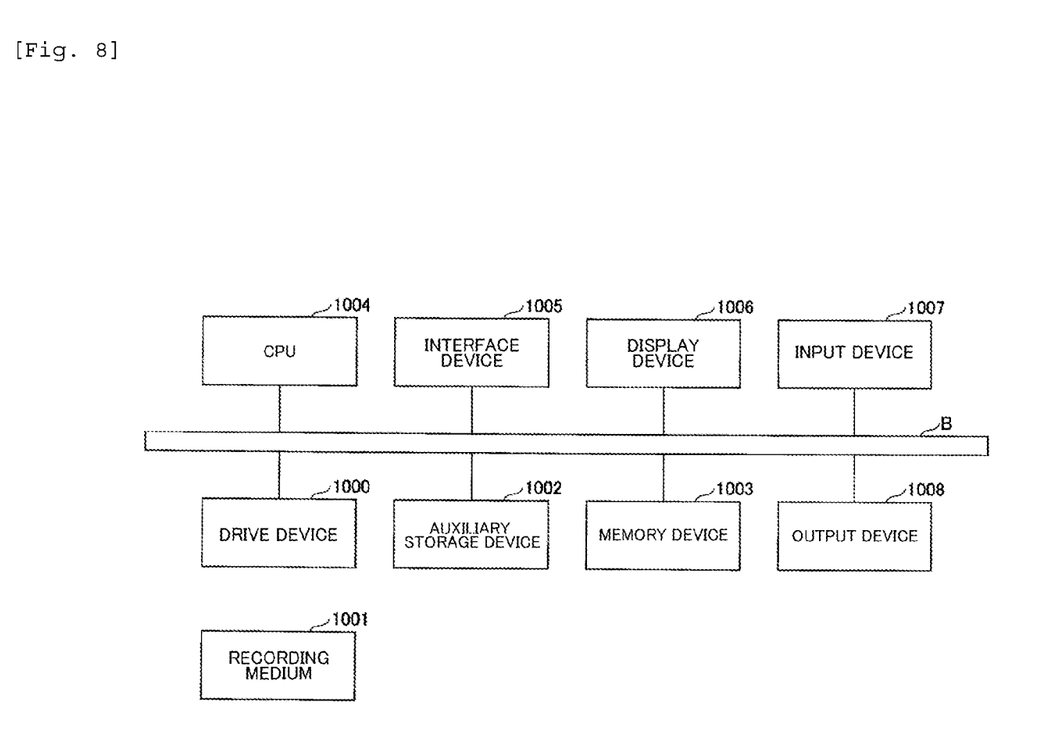
FIG. 8 is a diagram illustrating an example of a hardware configuration of the authentication apparatus.

FIG. 8 is a diagram illustrating a hardware configuration example of the computer. The computer in FIG. 8 includes a drive device 1000, an auxiliary storage device 1002, a memory device 1003, a CPU 1004, an interface device 1005, a display device 1006, an input device 1007, an output device 1008, and so forth, which are connected to each other through a bus B.

The program that realizes the processing on this computer is provided by a recording medium 1001 such as a CD-ROM, or a memory card. Upon the recording medium 1001 in which the program is stored being set in the drive device 1000, the program is installed from the recording medium 1001 to the auxiliary storage device 1002, via the drive device 1000. However, note that installation of the program does not necessarily have to be performed by the recording medium 1001, and may be downloaded from another computer via a network. The auxiliary storage device 1002 stores the installed program, and also stores necessary files, data, and so forth.

When there is a boot instruction for the program, the memory device 1003 reads out the program from the auxiliary storage device 1002 and stores the program. The CPU 1004 realizes the functions relating to the authentication apparatus 100 in accordance with the program stored in the memory device 1003. The interface device 1005 is used as an interface to connect to a network. The display device 1006 displays a GUI (Graphical User Interface) and so forth in accordance with the program. The input device 1007 is configured of a keyboard and a mouse, buttons, a touch panel, or the like, and is used for inputting various types of operating instructions. The output device 1008 outputs results of computation.

Next, Example 1 and Example 2 will be described as specific application examples of the authentication apparatus 100 according to the present embodiment.

EXAMPLE 1

Example 1 is an example in which the authentication apparatus 100 is applied to challenge-response authentication defined by UDS (Unified Diagnosis Services).

UDS is an application-level protocol for performing diagnosis, software updates, changes to settings, and so forth, of an in-vehicle ECU. When performing diagnosis or the like using UDS, the ECU authenticates the diagnostic tool by the challenge-response authentication defined in UDS, and the ECU permits the diagnostic tool to perform diagnosis, changes to settings, and so forth, on the ECU.

In Example 1, the technology according to the present invention is applied to this authentication. That is to say, the authentication described with reference to FIG. 5 and FIG. 6 can be performed without changing the protocol of UDS, by dynamically switching the challenge generating method from an application running on UDS.

Figure 9:
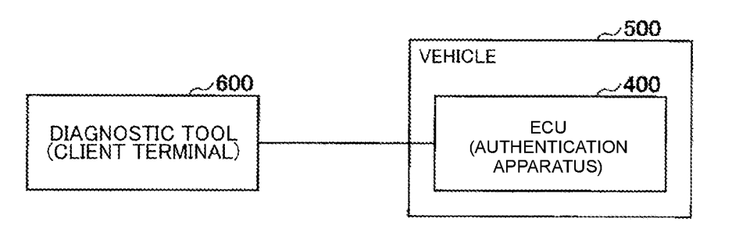
FIG. 9 is a diagram for describing Example 1.

FIG. 9 illustrates a system configuration example of Example 1. As illustrated in FIG. 9, in the present system, an ECU 400 is installed in a vehicle 500, the ECU 400 is connected to a diagnostic tool 600 by a connector such as OBD2 or the like, and communication is performed between the ECU 400 and the diagnostic tool 600.

In this configuration, the functions of the authentication apparatus 100 are included in the ECU 400, and the functions of the client terminal 200 are included in the diagnostic tool 600. The ECU 400 performs authentication of the diagnostic tool 600 by the same authentication method as the authentication method carried out by the authentication apparatus 100 described as above.

EXAMPLE 2

Example 2 is an example of applying the authentication apparatus 100 to CHAP (Challenge Handshake Authentication Protocol) authentication. The CHAP authentication is an authentication method commonly used in remote access.

Figure 10:
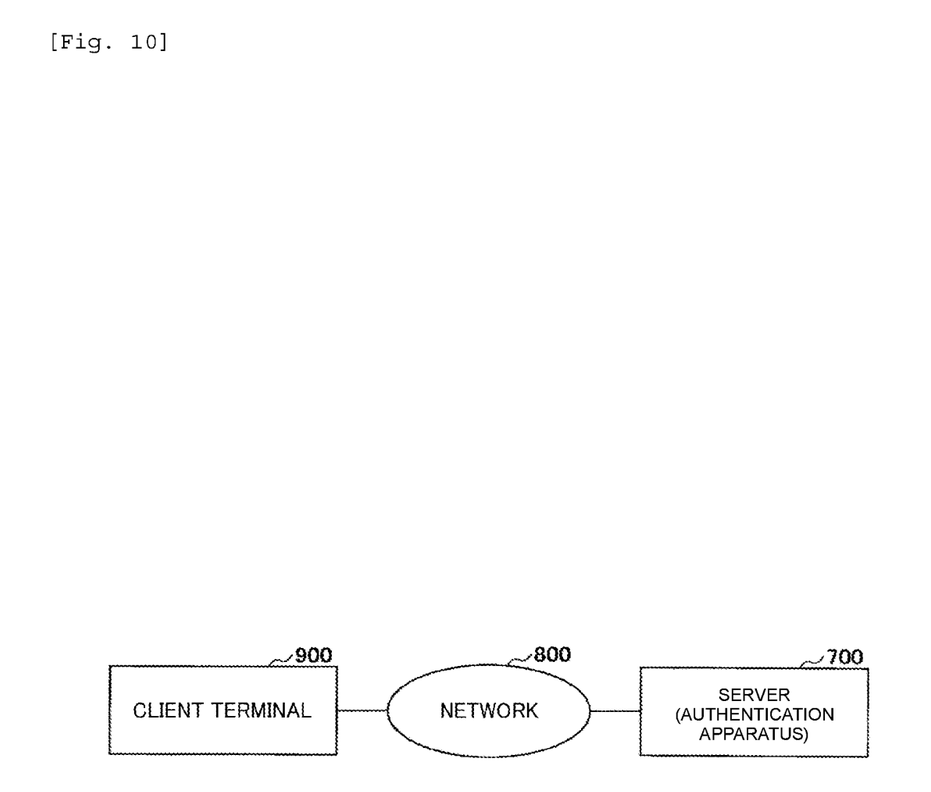
FIG. 10 is a diagram for describing Example 2.

FIG. 10 illustrates a system configuration example of Example 2. As illustrated in FIG. 10, the present system has a configuration in which a server 700 that is equivalent to a remote access server, and a client terminal 900 that executes remote access, are connected by a network 800.

In this configuration, the functions of the authentication apparatus 100 are included in the server 700, and the functions of the client terminal 200 are included in the client terminal 900. The server 700 performs authentication of the client terminal 900 by the same authentication method as the authentication method executed by the authentication apparatus 100 described as above.

More specifically, in the CHAP authentication, when the client terminal 900 transmits a username to the server 700, the server 700 generates a random key (challenge) on the basis of the username, and returns the random key to the client terminal 900. The client terminal 900 encrypts a password using this key, and returns the password to the server 700. The encrypted password corresponds to a response. The server 700 compares the encrypted password that is received with an encrypted password generated from a password that the server 700 itself holds, and if these passwords match, authentication is determined to be successful, and login from the client terminal 900 is permitted.

In accordance with the state transition described in FIG. 6, in a case of "challenge generating method=fixed generating", the server 700 returns the same challenge to the same password (the same client terminal 900), and in a case of "challenge generating method=random generating", returns a different challenge to the same password (the same client terminal 900).

Effects of Embodiment

As described above, the authentication apparatus 100 according to the present embodiment enables security to be improved in challenge-response authentication.

Summary of Embodiment

The present description describes at least the authentication apparatus, the authentication method, and the program described in the following items.

(Item 1)

An authentication apparatus that performs authentication of a client terminal by challenge-response authentication, the authentication apparatus including:
- a reception unit that receives a challenge request from the client terminal;
- a control unit that generates a challenge as to the challenge request; and
- a transmission unit that transmits the challenge to the client terminal,
- wherein the control unit generates the challenge by one generating method out of a fixed generating method in which a challenge of a fixed value is generated, and a random generating method in which a challenge of a random value is generated, in accordance with a state of the authentication apparatus.

(Item 2)

The authentication apparatus according to Item 1,
- wherein, in a case where the authentication apparatus is in a state of having received a challenge request from the client terminal for the first time, or in a case where the authentication apparatus is in a state of having received a challenge request from the client terminal for the first time after receiving a response regarding which authentication fails, the control unit generates the challenge by the random generating method.

(Item 3)

The authentication apparatus according to Item 1 or Item 2,
- wherein, in a case where the authentication apparatus is in a state of having received a challenge request from the client terminal for a second time or having received a challenge request from the client terminal following the second time before receiving a response, the control unit generates the challenge by the fixed generating method.

(Item 4)

The authentication apparatus according to any one of Item 1 to Item 3,
- wherein, in a case where the reception unit receives a response, authentication by the response fails, and a number of times of an authentication failure reaches a predetermined allowed count, the transmission unit does not transmit a challenge to the client terminal even in a case where the reception unit receives a challenge request from the client terminal.

(Item 5)

An authentication method executed by an authentication apparatus that performs authentication of a client terminal by challenge-response authentication, the authentication method including:
- a reception step of receiving a challenge request from the client terminal;
- a generating step of generating a challenge as to the challenge request; and
- a transmission step of transmitting the challenge to the client terminal,
- wherein, in the generating step, the challenge is generated by one generating method out of a fixed generating method in which a challenge of a fixed value is generated, and a random generating method in which a challenge of a random value is generated, in accordance with a state of the authentication apparatus.

(Item 6)

A program causing a computer to function as each of components of the authentication apparatus according to any one of Item 1 to Item 4.

Although the present embodiment has been described above, the present invention is not limited to this particular embodiment, and various modifications and alterations may be made within the scope of the essence of the present invention set forth in the Claims.

REFERENCE SIGNS LIST

- 100 Authentication apparatus
- 110 Transmission unit
- 120 Reception unit
- 130 Control unit
- 140 Data storage unit
- 200, 900 Client terminal
- 300, 800 Network
- 400 ECU
- 500 Vehicle
- 600 Diagnostic tool
- 700 Server
- 1000 Drive device
- 1001 Recording medium
- 1002 Auxiliary storage device
- 1003 Memory device
- 1004 CPU
- 1005 Interface device
- 1006 Display device
- 1007 Input device
- 1008 Output device

The invention claimed is:

1. An authentication apparatus that performs authentication of a client terminal by challenge-response authentication, the authentication apparatus comprising:
   one or more computers each including a memory and a processor configured to:
   receive a challenge request from the client terminal;
   generate a challenge as to the challenge request; and
   transmit the challenge to the client terminal, wherein
   the memory and the processor are configured to generate the challenge by one generating method out of a fixed generating method in which a challenge of a fixed value is generated, and a random generating method in which a challenge of a random value is generated, in accordance with a state of challenge-response authentication with the client terminal.

2. The authentication apparatus according to claim 1, wherein
   in a case where the authentication apparatus is in a state of having received a challenge request from the client terminal for the first time, or in a case where the authentication apparatus is in a state of having received a challenge request from the client terminal for the first time after receiving a response by which authentication fails, the memory and the processor are further configured to generate the challenge by the random generating method.

3. The authentication apparatus according to claim 1, wherein
in a case where the authentication apparatus is in a state of having received a challenge request from the client terminal for a second time or having received a challenge request from the client terminal following the second time before receiving a response, the memory and the processor are further configured to generate the challenge by the fixed generating method.

4. The authentication apparatus according to claim 1, wherein
in a case where the memory and the processor receive a response, authentication by the response fails, and a number of times of an authentication failure reaches a predetermined allowed count, the memory and the processor are configured not transmit a challenge to the client terminal even in a case where the memory and the processor receive a challenge request from the client terminal.

5. An authentication method executed by an authentication apparatus that performs authentication of a client terminal by challenge-response authentication, the authentication method comprising:
receiving a challenge request from the client terminal;
generating a challenge as to the challenge request; and
transmitting the challenge to the client terminal, wherein the challenge is generated by one generating method out of a fixed generating method in which a challenge of a fixed value is generated, and a random generating method in which a challenge of a random value is generated, in accordance with a state of challenge-response authentication with the client terminal.

6. A non-transitory computer-readable recording medium having computer-readable instructions stored thereon, which when executed cause a computer including a memory and a processor to execute each of operations of the authentication apparatus according to claim 1.

* * * * *